United States Patent [19]

Bedwell

[11] Patent Number: 5,090,020
[45] Date of Patent: Feb. 18, 1992

[54] APPARATUS FOR CONTROLLING THE COMPOSITION OF A LASER GAS OR GAS MIXTURE

[75] Inventor: David J. Bedwell, Bristol, United Kingdom

[73] Assignee: British Aerospace Public Limited Company, London, England

[21] Appl. No.: 605,857

[22] Filed: Oct. 31, 1990

[30] Foreign Application Priority Data

Dec. 1, 1989 [GB] United Kingdom ............... 8927209

[51] Int. Cl.[5] .......................................... H01S 3/22
[52] U.S. Cl. ...................................... 372/59; 372/58; 372/34; 372/52
[58] Field of Search ........................... 372/58, 59, 34

[56] References Cited

U.S. PATENT DOCUMENTS

| | | | |
|---|---|---|---|
| 3,605,036 | 9/1971 | Barnaby | 331/94.5 |
| 4,606,030 | 8/1986 | Berkowitz et al. | 372/55 |
| 4,674,092 | 6/1987 | Cannon | 372/55 |
| 4,723,254 | 2/1988 | Turner | 372/59 |

FOREIGN PATENT DOCUMENTS

199934 11/1986 European Pat. Off. .
2217842 11/1989 United Kingdom .
WO89/01252 2/1989 World Int. Prop. O. .

*Primary Examiner*—Léon Scott, Jr.
*Attorney, Agent, or Firm*—Cushman, Darby & Cushman

[57] ABSTRACT

Apparatus for controlling the composition of a laser gas or gas mixture includes a cryogenic gas-processor (2) connectible to a gas laser (1) selectively to receive gas or a gas mixture therefrom, remove impurities from the gas or gas mixture and selectively return the purified gas or gas mixture to the laser (1). A high temperature gas-purifier (3) is provided in gas flow connection with the processor (2) and with the laser (1) selectively to receive gas or a gas mixture therefrom, remove halogen and/or impurities from the gas or gas mixture and selectively return the dehalogenated or purified gas or gas mixture to the laser (1). Gas analysis means (4) is provided for receiving gas or gas mixture from the laser (1) to analyze it and produce output signals indicative of the actual composition of the laser gas or gas mixture. The output signals are passed to control means (6) operative to compare the actual composition values with desired composition values and operate the processor (2) and/or purifier (3) and/or a clean gas or gas mixture source (5) selectively connectible to the laser (1) to control the laser gas or gas mixture composition.

11 Claims, 2 Drawing Sheets

APPARATUS FOR CONTROLLING THE COMPOSITION OF A LASER GAS OR GAS MIXTURE

FIELD OF THE INVENTION

This invention relates to an apparatus for controlling the composition of a laser gas or gas mixture, and is concerned particularly, but not exclusively, with such an apparatus for use with an excimer laser.

BACKGROUND OF THE INVENTION

To ensure optimal output from an excimer gas laser it is necessary to maintain a fixed laser gas or gas mixture composition. Variation of the laser gas or gas mixture composition can occur due to the impurities set up either by the laser operation or by pick-up from components used in the laser, such as plastics. It has been proposed to use a cryogenic trap to remove some impurities by liquifaction, but this technique has the drawback that it does not allow the removal of all possible impurities.

An excimer laser gas mixture typically comprises one or more rare gases such as Helium, Neon, Xenon and Krypton and a halogen containing molecule such as Fluorine or Hydrogen Chloride. A further technique has been proposed for impurity removal by subjecting the laser gas or gas mixture to a high temperature reaction to remove impurities and the halogen. Whilst both the foregoing proposed techniques are successful to some extent in removing impurities from a laser gas or gas mixture, they are not suitable individually for maintaining a control of the composition of a laser gas or gas mixture to within specified limits.

OBJECTS OF THE INVENTION

Thus one object of the present invention is to provide a generally improved apparatus for controlling the composition of a laser gas or gas mixture.

This and other objects and advantages of the present invention will become more apparent from details disclosed in the following specification, where preferred embodiments of the invention are described.

SUMMARY OF THE INVENTION

According to a first embodiment of the present invention, there is provided apparatus for controlling the composition of a laser gas or gas mixture, including a cryogenic gas-processor connectable to and substantially in parallel with a gas laser selectively to receive gas or a gas mixture therefrom, remove impurities from the gas or gas mixture and selectively return the purified gas or gas mixture to the gas laser, a high temperature gas-purifier in a gas flow connection with the cryogenic gas-processor, substantially in parallel therewith, and connectable to and substantially in parallel with the gas laser selectively to receive gas or a gas mixture therefrom, remove halogen and/or impurities from the gas or gas mixture and selectively return the dehalogenated or purified gas or gas mixture to the gas laser, gas analysis means connectible to receive gas or gas mixture from the gas laser and operative to analyse the gas or gas mixture and produce output signals indicative of the actual composition of the laser gas or gas mixture, a source of clean laser gas or of individual components of a laser gas mixture connectible selectively to feed clean gas of selected clean gas mixture components to the gas laser, and control means operative to receive said output signals from the gas analysis means indicative of the actual composition of the laser gas or gas mixture, compare the actual composition values with desired composition values, and operate the cryogenic gas-processor and/or high temperature gas-purifier and/or clean gas or gas mixture source to control the laser gas or gas mixture composition.

Preferably the control means includes a computer.

Advantageously the apparatus is connectable to an excimer gas laser.

Conveniently the apparatus is connectible to an excimer gas laser containing a gas or gas mixture including one or more rare gases such as Helium, Neon, Xenon, Krypton or Argon and a halogen containing molecule such as one or more of Fluorine or hydrogen Chloride.

Preferably the apparatus is connectible to an excimer gas laser containing as impurities, in the gas or gas mixture, one or more of $CO_2$, $Cl_2$, $CO$, $CCl_4$, $SiF_4$, $HF$, $NO$, $NO_2$, $N_2O_4$, $H_2O$, $NH_3$, $N_2$, $O_2$, $H_2$, $CF_2O$, $OF_2$, $Ch_3CL$, $CH_4$ and $CH_3F$.

Advantageously said cryogenic gas-processor is operable to remove, via liquifaction, one or more of said impurities.

Conveniently the apparatus includes first and second openable and closable gas flow valves respectively on input and output sides of the cryogenic gas-processor operable selectively to control gas flow between the gas laser and the cryogenic gas-processor.

Preferably the high temperature gas-purifier includes a high temperature getter operable to remove, via hot metallic means, halogen and/or impurities from the gas or gas mixture.

Advantageously the apparatus includes third and fourth openable and closable gas flow valves respectively on input and output sides of the high temperature gas-purifier operable selectively to control gas flow between the gas laser and the high temperature gas-purifier.

Conveniently the apparatus includes a gas compressor in valved gas flow connection with the output side of the cryogenic gas-processor and high temperature gas-purifier, and gas storage means in valved connection with the output side of the cryogenic gas-processor and in gas flow connection with the gas compressor, with the gas processor and gas storage means being operable, via the control means, to receive and store gas or gas mixture from the gas laser to facilitate maintenance and/or repair being carried out on the gas laser, or to receive gases separated from a laser gas mixture by the cryogenic gas-processor.

Preferably the source of clean gas or of clean individual components of a laser gas mixture includes individual containers for the or each gas or components, means for selectively communicating said containers with a gas flow line connectible to the gas laser and a fifth openable and closable gas flow valve in said line intermediate the containers and an end of the line connectible to the gas laser.

DESCRIPTION OF THE DRAWINGS

For a better understanding of the present invention, and to show how the same may be carried into effect, reference will now be made, by way of example, to the accompnaying drawings in which.

DESCRIPTION OF EMBODIMENTS OF THE INVENTION

Figure 1:
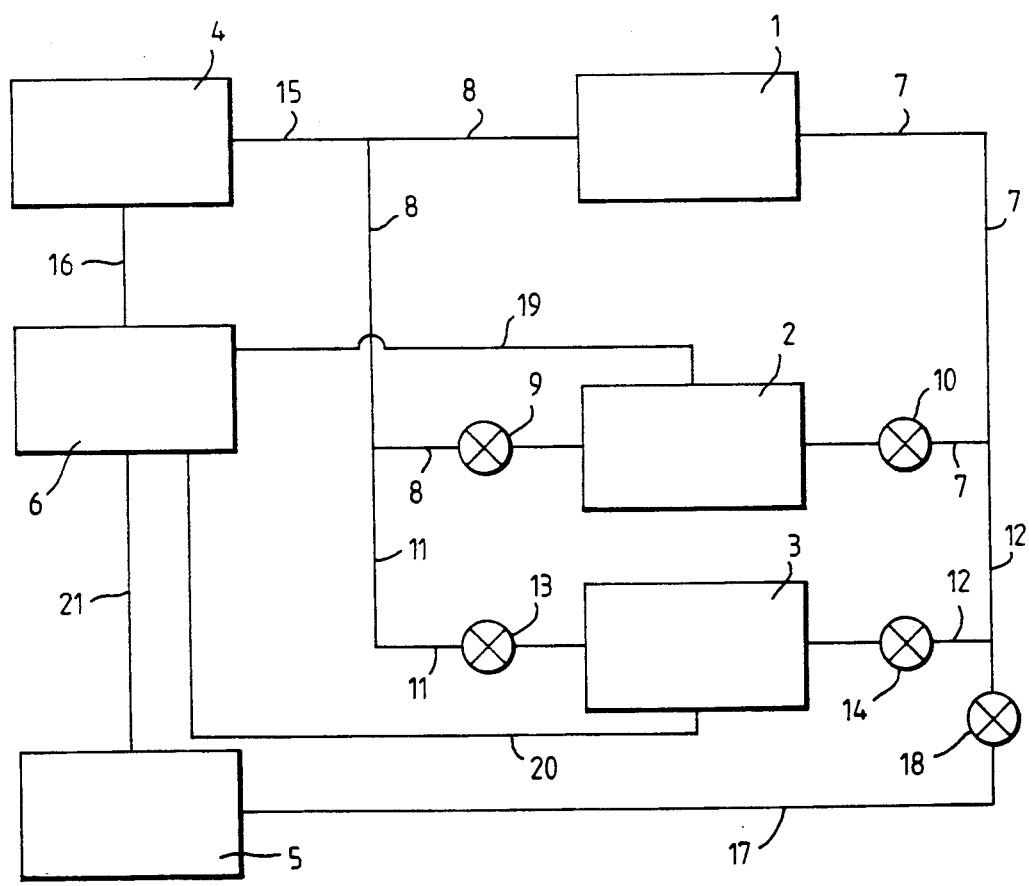
FIG. 1 is a diagrammatic view of an appartus according to a first embodiment of the invention for controlling the composition of a laser gas or gas mixture.

Apparatus for controlling the composition of a laser gas or gas mixture, preferably of an excimer laser gas or gas mixture, according to a first embodiment of the invention is shown in FIG. 1 of the accompnaying drawings. In this embodiment the apparatus is used for controlling the composition of the laser gas or gas mixture of a laser such as an excimer laser 1. It is to be understood, however, that the apparatus may also be used for controlling the composition of a laser gas or gas mixture of other forms of gas lasers. The apparatus basically includes a cryogenic gas-processor 2 connected to the gas laser 1 substantially in parallel therewith, a high temperature gas-purifier 3 in gas flow connection with the cryogenic gas-processor 2, substantially in parallel therewith, and connectible to and substantially in parallel with the laser 1, gas analysis means 4, a source 5 of clean laser gas or clean individual components of a laser gas mixture and control means 6.

The cryogenic gas-processor 2 is in gas flow connection with the laser 1 via a first line 7 which acts as an output from the processor 2 and an input to the laser 1 and a second line 8 which acts as an output from the laser 1 and an input to the processor 2. By means of the lines 7 and 8 the processor 2 is operable selectively to receive gas or a gas mixture from the laser 1, remove impurities from the gas or gas mixture and selectively return the purified gas or gas mixture to the laser 1.

In the case where the laser 1 is an excimer gas laser the laser gas or gas mixture includes one or more rare gases such as Helium, Neon, Xenon, Krypton and Argon and a halogen containing molecule such as one or more of Fluorine or Hydrogen Chloride. Advantageously a suitable excimer laser gas mixture would contain about 99% of one or more of Helium and Neon, about 0.9% of one or more of Xenon, Krypton and Argon and about 0.1% of Fluorine and/or hydrogen Chloride. Thus in such a laser gas mixture the halogen containing molecule will combine with the Xenon, Krypton or Argon to form Xenon, Krypton or Argon Fluoride or Chloride (i.e. XeF, Xe, Cl, KrF, KrCl, ArCl, ArF).

The processor 2 makes use of the fact that different gases liquify at different temperatures to provide a cryogenic trap whereby the impurities may be removed from the laser gas mixture. Typical impurities are one or more of $CO_2$, $Cl_2$, $CO$, $CCl_4$, $CF_4$, $SiF_4$, $HF$, $NO$, $NO_2$, $N_2O_4$, $H_2O$, $NH_3$, $N_2$, $O_2$, $H_2$, $CF_2O$, $OF_2$, $CH_3CL$, $CH_4$ and $CH_3F$, which may be present as a result of pick-up from components of the laser 1 or of the apparatus in general which may be made of plastics material. The gas or gas mixture is fed selectively to or from the processor 2 and to or from the laser 1 via the lines 7 and 8 by means of a first openable and closable gas flow valve 9 in the line 8 on the input side of the processor 2 and a second openable and closable gas flow valve 10 located in the first gas flow line 7 on the output side of the processor 2.

The high temperature gas-purifier 3 is also in gas flow connection with the processor 2 by means of a third gas flow line 11 and a fourth gas flow line 12. The purifier 3 is connected to the processor 2 and laser 1, substantially in parallel therewith, by means of the line 11 which forms an input to the purifier 3, an output from the processor 2 and an output from the laser 1 via the line 8 to which it is connected. The line 12 connects the laser 1, processor 2 and purifier 3 by connecting the output sides of the purifier 3 and the processor 2 to the input side of the laser 1 via the gas line 7. The purifier 3 is operable selectively to receive gas or a gas mixture from the laser 1, remove halogen and/or impurities from the gas or mixture and selectively return the dehalogenated or purified gas or gas mixture to the laser 1.

To this end to enable the selective operation a third openable and closable gas flow valve 13 is located on the input side of the purifier 3 in the line 11 and a fourth openable and closable gas flow valve 14 is located on the output side of the purifier 3 in the line 12. The valves 13 and 14 are operable selectively to control gas flow between the laser 1 and the high temperature gas purifier 3 so that 13 controls the flow of gas from the laser 1 into the purifier 3 and 14 controls the flow of purified gas from the purifier 3 back into the laser 1.

The gas purifier 3 includes a high temperature getter operable to remove, via hot metallic means, halogen and/or impurities from the gas or gas mixture. The hot metallic means bay be hot metal which reacts with halogens and/or impurities to produce salts of a low vapour pressure. The more volatile of these salts may be removed by a cool or cold trap. In this way it is possible to remove halogen from the gas or gas mixture if the halogen content is too high.

The gas analysis means 4 is connected to the laser 1 via a fifth gas flow line 15 which is in gas flow connection with the line 8 to act as an input to the analysis means 4 from the laser 1. The gas analysis means 4 is operative to analyse the gas or gas mixture received from the laser 1 and produce output signals 16 indicative of the actual composition of the laser gas or gas mixture. These signals 16 are passed to the control means 6 on request from the control means 6.

The source 5 of clean laser gas or of clean individual components of a laser gas mixture is connected selectively to feed clean gas or selected clean gas mixture components to the gas laser 1 via a sixth gas flow line 17 which is connected to the line 12 on the output side of the valve 14 via a fifth openable and closable gas flow valve 18. The source 5 can include individual containers, not shown, for the or each gas or components all of which are connectable selectively with the gas flow line 17 on demand. In this way the composition of the gas or gas mixture supplied to the laser 1 can be controllably varied.

To ensure that the composition is controlled correctly as required the control means 6 includes a computer (not shown) and is operative to receive the output signals 16 from the gas analysis means 4 which are indicative of the actual composition of the laser gas or gas mixture in the laser 1, compare the actual composition values with desired composition values held in the control means 6 and operate the cryogenic gas-processor 2 and/or high temperature gas-purifier 3 via respective control lines 19 and 20. Additionally the control means 6 is operable to control the operation of the source 5 and valve 18 by control signals 21. In this way the control means 6 compares the actual gas or gas mixture composition values received from the gas analysis means 4 with the desired values and if the halogen content is too high the gas of gas mixture in the laser 1 is passed through the high temperature gas-purifier 3. If the halogen content is too low the halogen content is replenished via the source 5 under the control of the control means 6. If certain impurities are too high then the control means 6 makes appropriate choice of the processor 2 and purifier 3 and passes the gas or gas mixture from the laser 1 thereto, after reference to a stored data base on vapour pressures. Thus the apparatus of the embodiment of FIG. 1 allows complete control to be exercised over the composition of the gas or gas mixture in the laser 1.

Figure 2:
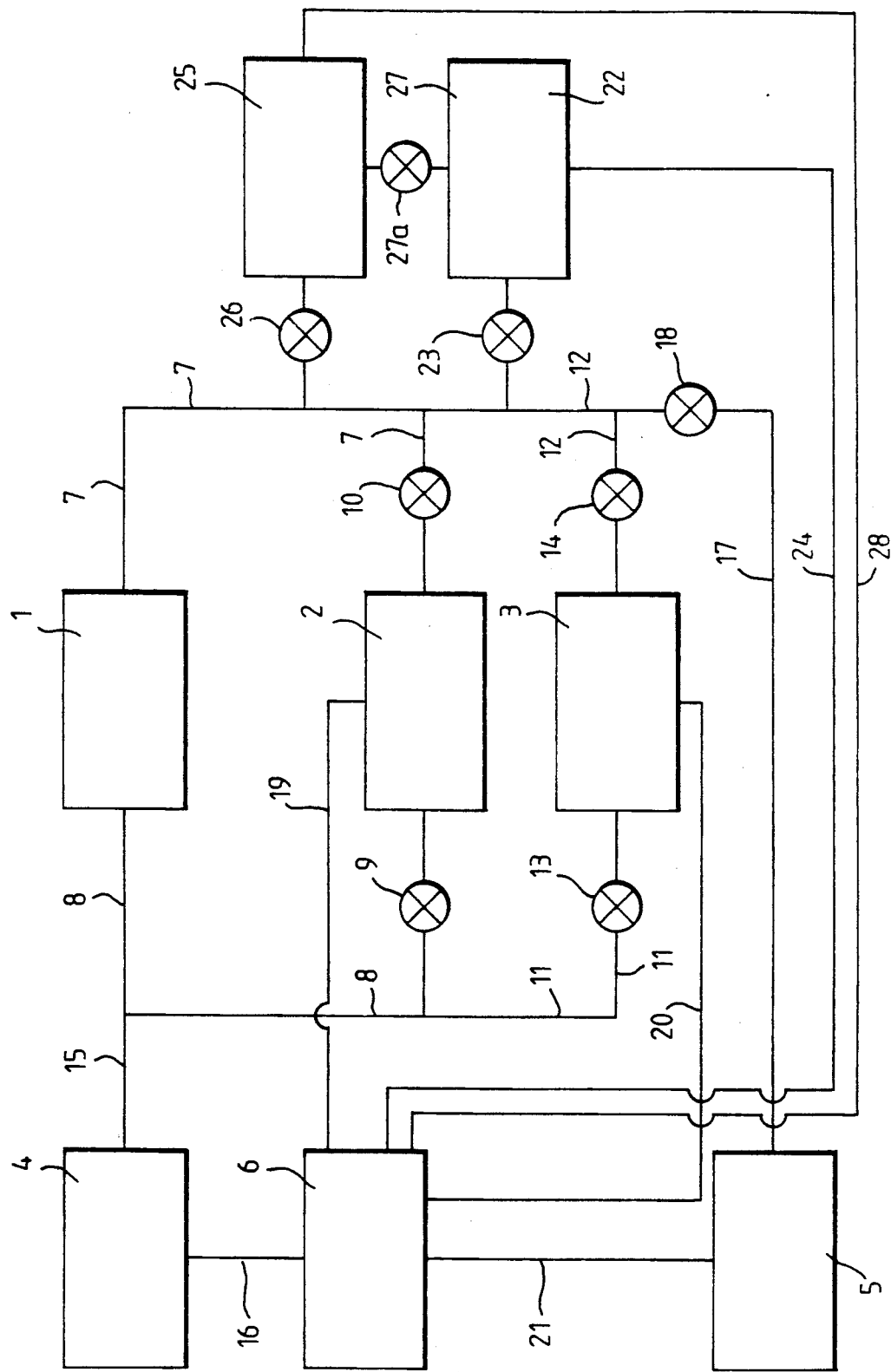
FIG. 2 is a diagrammatic view of apparatus for controlling the composition of a laser gas or gas mixture according to a second embodiment of the present invention.

The apparatus according to a second embodiment of the present invention as shown in FIG. 2 is basically the same as that of FIG. 1 and like components have been given like reference numerals and will not be further described in detail. However, the apparatus of FIG. 2 also includes a gas compressor 22 in gas flow connection via a valve 23 with the gas line 12 on the output side of the valves 10 and 14 from the processor 2 and purifier 3 respectively. The gas compressor can thus be operated via selective operation of the valves 10, 14 and 23 under the control of the control means 6 to receive gas either from the processor 2, purifier 3 or both. Operation of the compressor 22 is controlled by the control means 6 via a control line 24. Gas storage means 25 are also provided in connection with the line 7 on the output side of the processor 2 and purifier 3 via a further selectively operable openable and closable valve 26. The compressor 22 and gas storage means 25 are in gas flow connection via a gas flow line 27 in which is a selectively openable and closable valve 27a. The valve 27a is operable so that the gas storage means 25 can be sealed off from the compressor 22. The gas storage means 25 is operable via the valves 26 and 27a under the control of the control means 6 via a control line 28. The control line 28 may provide a pressure monitor or line. The gas storage means 25 is operable to receive and store gas or gas mixture from the gas laser 1 to facilitate maintenance and/or repairs being carried out on the gas laser 1 or to receive gases separated from a laser gas mixture by the cryogenic gas-processor 2.

Thus the compressor 22 and gas storage means 25 may be operated by the control means 6 to recover the gas or gas mixture from the laser 1 when, for example, it is necessary to open up the laser 1. Alternatively or additionally once the halogen and impurity contents have been removed from the gas or gas mixture from the laser 1 by means of the processor 2 and/or purifier 3 it is possible to achieve separation of remaining rare gases cryogenically in the processor 2. This allows Xenon, Krypton or Argon to be trapped out from a mixture with Helium and/or Neon if liquid Nitrogen is used as a basis for the cryogenic gas-processor 2. Once the Xenon, Krypton or Argon has been isolated, it can be stored elsewhere through cryogenic or mechanical pumping, or even stored in the container 25. Similarly the Helium and/or Neon can be stored either in the apparatus or separate therefrom after compression in the compressor 22. Thus the embodiment of FIG. 2 not only allows the same control of the composition to be performed as in the embodiment of FIG. 1, but it also allows for rare gas separation and storage. The current high price of rare gases makes such recovery economically viable.

Various modifications and alterations may be made to the embodiments of the present invention described and illustrated, within the scope of the present invention as defined in the following claims.

What is claimed is:

1. An apparatus for controlling composition of a gaseous material for use in a laser, said apparatus comprising:
   a cryogenic gas-processor including means for connecting said cryogenic gas-processor to and substantially in parallel with a gas laser selectively to receive said gaseous material therefrom, and to remove impurities from the gaseous material and selectively return purified gaseous material to the gas laser,
   a high temperature gas-purifier in gas flow connection with the cryogenic gas-processor, substantially in parallel therewith, and including means for connecting said high temperature gas-purifier to and substantially in parallel with the gas laser selectively to receive the gaseous material therefrom, and to remove at least one of halogen and impurities from the gaseous material and selectively return the one of dehalogenated and purified gaseous material to the gas laser,
   gas analysis means including means for connecting said gas analysis means so as to receive the gaseous material from the gas laser and for analyzing the gaseous material and produce output signals indicative of an actual composition of the gaseous material of the laser,
   a source of clean laser gaseous material connected selectively to feed clean gaseous material to the gas laser, and
   control means for receiving said output signals from the gas analysis means indicative of the actual composition of the gaseous material of the laser, for comparing actual composition values with desired composition values, and for operating at least one of the cryogenic gas-processor, the high temperature gas-purifier and the source of clean laser gaseous material to control the gaseous material of the laser.

2. An apparatus according to claim 1, wherein the control means includes a computer.

3. An apparatus according to claim 2, wherein said gas laser is an excimer laser.

4. An apparatus according to claim 3, wherein said excimer laser contains a gaseous material including at least one rare gas and a halogen containing molecule.

5. An apparatus according to claim 4, wherein said gaseous material contains at least one of Helium, Neon, Xenon, Krypton and Argon and the halogen molecule is at least one of Flourine and Hydrogen Chloride.

6. An apparatus according to claim 5, wherein the impurities, in the gaseous material, are at least one of $CO_2$, $Cl_2$, $CO$, $CCl_4$, $CF_4$, $SiF_4$, $HF$, $NO$, $NO_2$, $N_2O_4$, $H_2O$, $NH_3$, $N_2$, $O_2$, $H_2$, $CF_2O$, $OF_2$, $CH_3Cl$, $CH_4$ and $CH_3F$.

7. An apparatus according to claim 6, wherein said cryogenic gas-processor removes impurities by liquification.

8. An apparatus according to claim 7, further comprising first and second openable and closable gas flow valves, respectively disposed on input and output sides of the cryogenic gas-processor selectively operable to control gas flow between the gas laser and the cryogenic gas-processor.

9. An apparatus according to claim 8, wherein the high temperature gas-purifier includes a high temperature getter for removing, via hot metallic means, at least one of halogen and impurities from the gaseous material.

10. An apparatus according to claim 9, further comprising a gas compressor connected through a gas valve with the output side of the cryogenic gas-processor and high temperature gas-purifier, and gas storage means connected through a valve with the output side of the gas-processor and high temperature gas-purifier and connected so as to allow gas flow with the gas compressor, with the gas compressor and gas storage means being run by the control means for receiving and storing the gaseous material from the gas laser, and for receiving gases separated from a laser gas mixture by the cryogenic gas-processor.

11. An apparatus according to claim 10, wherein the source of clean gaseous material for the laser further comprises individual containers for each gas, means for selectively communicating said containers with a gas flow line connected to the gas laser, and a fifth openable and closable gas flow valve disposed between the container and an end of a flow passage connected to the gas laser.

* * * * *